April 22, 1930.　　　　　L. JAENICHEN　　　　　1,755,478
SCALE
Filed Sept. 19, 1927　　　3 Sheets-Sheet 3

INVENTOR.
Louis Jaenichen
BY Francis D. Hardesty
ATTORNEY.

Patented Apr. 22, 1930

1,755,478

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN

SCALE

Application filed September 19, 1927. Serial No. 220,348.

The present invention relates to scales particularly those of the simple beam type.

Among the objects of the invention is a scale that is independent in its use of accurate leveling of the base or supporting platform.

Another object is a scale in which the active weighing mechanism will be self-leveling.

Another object is a self leveling scale that can be fixed in leveled position so that its accuracy will not be impaired by having its base in a tilted position.

Still another object is a scale of which the movable parts may be locked against movement to thereby prevent damage during transport.

Other objects will readily appear to those skilled in the art upon reference to the following description and accompanying drawings, in which:—

Figure 1:
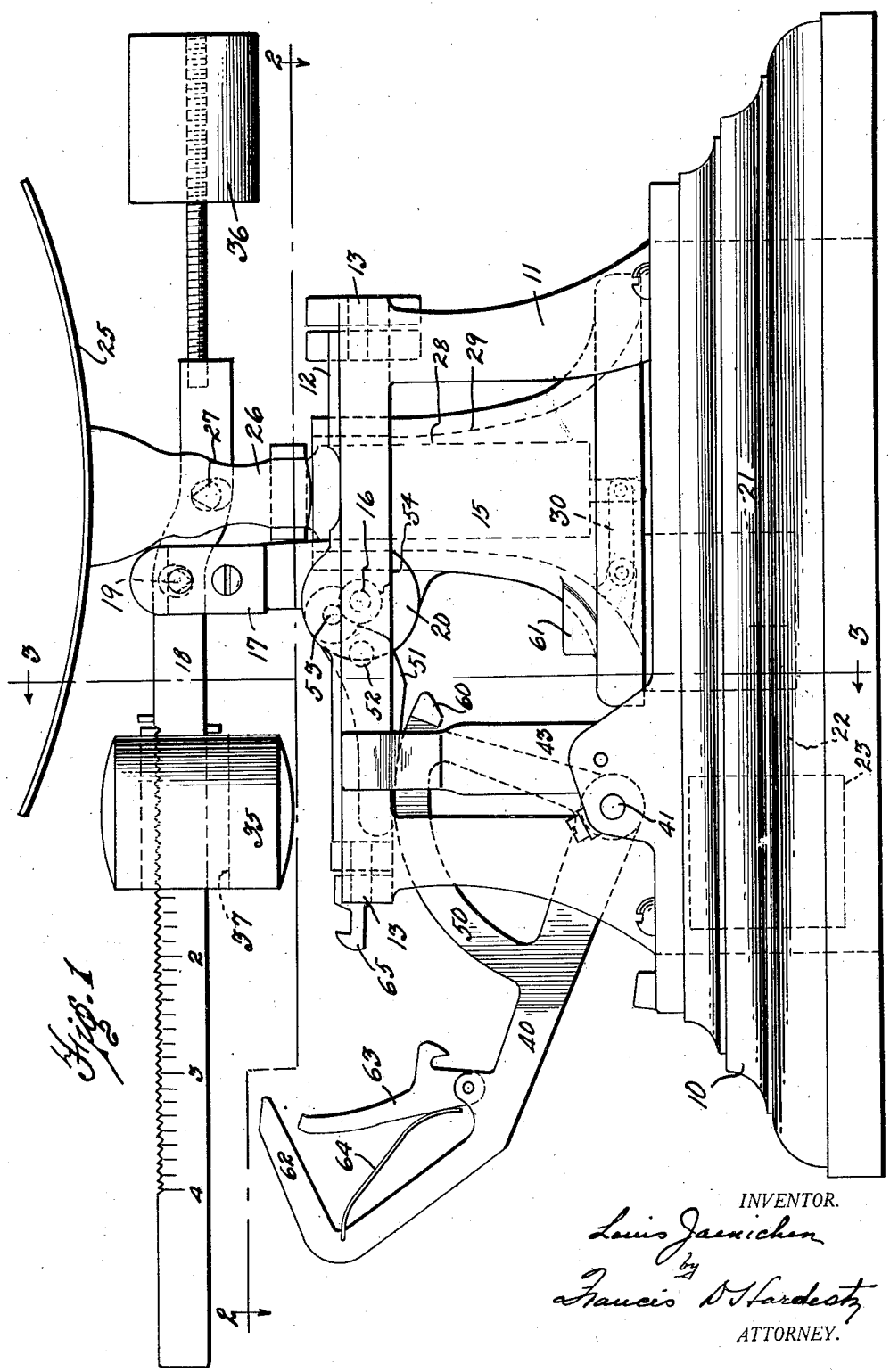
Fig. 1 is a side elevation of the scale.
Figure 2:
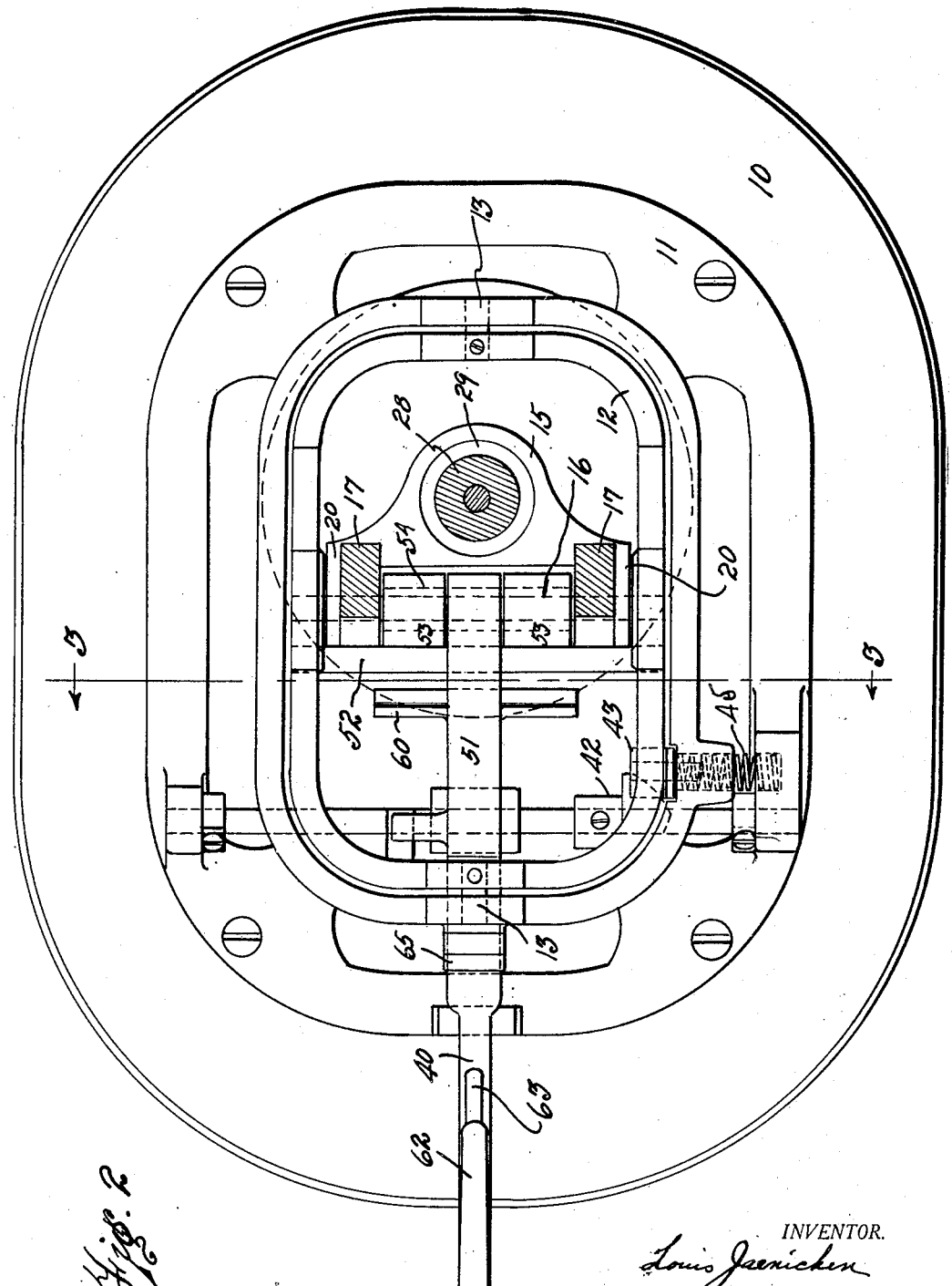
Fig. 2 is a section on line 2—2 of Fig. 1.

In the drawings, a ring shaped base 10 carries a frame 11, also ring shaped, which is provided in its upper end with a ring 12 pivoted at the ends as shown at 13. Pivoted at right angles to the line of pivots 13 in ring 12, is a beam supporting member 15. This member is carried on the cross shaft 16 and has integral therewith the uprights 17 provided with bearings for the weighing beam 18.

The member 15 is preferably supported on shaft 16 through laterally extending eyes 20 and is formed with a weighting block 21 serving partially to bring the center of mass back under shaft 16. In this block 21 is mounted a threaded shaft 22 carrying an adjustable weight 23 serving to bring the center of mass accurately under the shaft.

Carried upon the beam 18 is a scale pan 25 mounted upon a Y-shaped member 26 which is supported upon the knife edges 27 carried by the beam and whose stem 28 extends down into member 15 which is hollow as indicated at 29. At its lower end stem 28 is connected to member 15 through a light link 30 to prevent undue lateral movement.

Beam 18 is provided with the usual sliding weight 35 and balancing counter poise 36, the former having an unusually large slot 37 therein for a purpose to be described.

Scales made in accordance with the foregoing will arrange themselves with the beam and pan in leveled position even though the base 10 is tilted. However, in order to be able to weigh upon them, they must be held in position after levelling. Mechanism for doing this is shown in the present structure.

Figure 3:
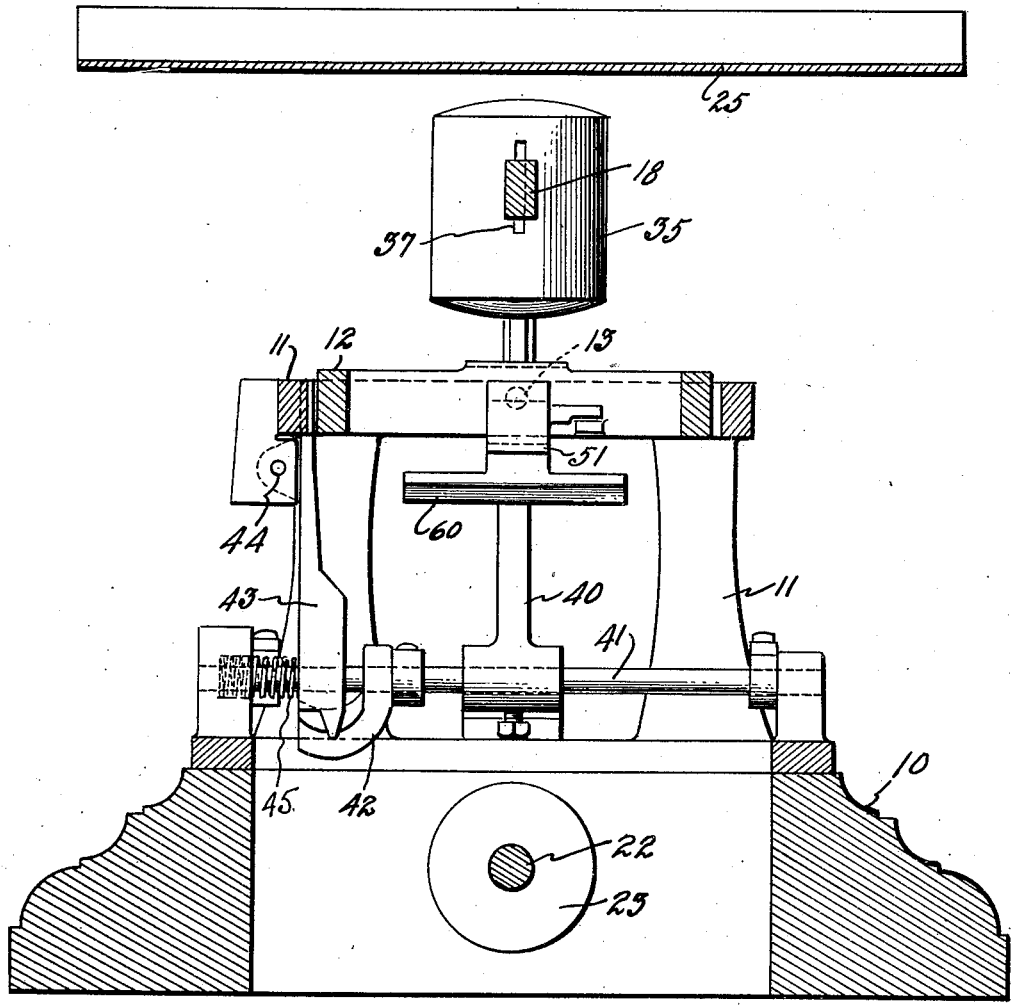
Fig. 3 is a section on line 3—3 of Fig. 1.

The holding means includes a lever 40 fixed to a shaft 41 extending across the lower part of frame 11. This shaft 41 carries fixed thereto a cam piece 42 coacting with a lever 43 pivoted to frame 11 at 44, which lever extends up between the frame 11 and ring 12. These parts are so arranged that when the lever 40 is depressed the cam 42 presses the lower end of lever 43 to the left (Fig. 3) and causes the upper end to press against ring 12 and frictionally hold it against movement on its pivots 13. A spring 45 is used to return the lever 43 to inactive position.

Lever 40 is further provided with an upwardly projecting cam segment 50 increasing in radius away from the lever. This cam segment 50 is adapted to coact with a lever 51 carried on a shaft 52 extending across ring 12. This lever carries at the end opposite cam 50 a braking element 53 adapted to press upon the intermediate enlarged portions 54 of shaft 16 to prevent movement thereof and thereby hold member 15. When therefore the lever 40 is in its lowest position the lever 43 locks ring 12 and the lever 51 locks the scale proper represented by member 15, so that the scale may be used.

In its intermediate position, lever 40 is arranged to release both of levers 43 and 51 to permit the scale to level itself.

In its upper position, lever 40 is arranged to lock the several parts to the frame 11 so that the scale may be transported without damage. This is accomplished by providing the lever 40 with a foot 60 adapted to press upon a flat shoulder 61 on member 15 and with a beak 62 which enters slot 37 in weight 35 when the latter is in its zero position. This beak 62 is arranged to lift and hold the lever 18 to an angular position sufficient to separate the pivots 19 and 27 from contact with their bearings in members 17 and 26. The lever 40 is then held in this upper position by a hook 63 thrust forward by spring 64 and adapted to coact with hook 65 carried by frame 11.

The present device is particularly adapted for use on road vehicles where the supporting means, such as a shelf or table, cannot be leveled for each use. The scale in such cases levels itself even though the base 10 may be tilted. In such uses, the lever 40 will be released from hook 65 and moved to its intermediate position until the scale has leveled itself. Then lever 40 is moved to its lowest position, thereby locking the scale parts in leveled position.

Now having described the invention and the preferred form of embodiment thereof, it is to be understood that the said invention is not to be limited to the specific details herein set forth but, only by the scope of the claims which follow.

I claim:—

1. A weighing scale comprising a scale beam, pan and sliding weight constituting a weighing unit, a frame upon which said unit is mounted so as to swing freely in any direction, and means to lock said unit in any position assumed thereby.

2. A weighing scale comprising a scale beam, pan and sliding weight constituting a weighing unit, a frame upon which said unit is mounted so as to swing freely in any direction, means to lock said unit in any position assumed thereby, and means to lock the parts of the weighing unit to the frame in inoperative position.

3. A weighing scale comprising a scale beam, load pan and sliding weight constituting a weighing unit, a frame upon which said unit is mounted to swing freely in any direction, means to lock the parts of said unit upon said frame in inoperative position, means to cause said unit to assume a level position when released from said lock irrespective of the position of said frame, and means to lock the unit in its leveled position to said frame.

4. A scale comprising a base frame, a supporting ring carried thereon and pivoted to swing on one of its axes, a weighing unit carried by said ring and pivoted to swing therein on an axis at right angles to the first axis, weighting means secured to said unit within said frame to cause said unit to assume a leveled position, and brakes operable to prevent swinging of the parts on said axes.

5. A scale comprising a base frame, a supporting ring carried thereon and pivoted to swing on one of its axes, a weighing unit carried by said ring and pivoted to swing therein on an axis at right angles to the first axis, weighting means secured to said unit within said frame to cause said unit to assume a leveled position, brakes operable to prevent swinging of the parts on said axes and a lever operatively connected to operate said brakes in one position and release them in a second position.

6. A scale comprising a base frame, a supporting ring carried thereon and pivoted to swing on one of its axes, a weighing unit carried by said ring and pivoted to swing therein on an axis at right angles to the first axis, weighting means secured to said unit within said frame to cause said unit to assume a leveled position, brakes operable to prevent swinging of the parts on said axes, a lever operatively connected to operate said brakes in one position and release them in a second position and means carried by said lever to lock the parts of the weighing unit to the base frame when in a third position.

7. A weighing scale comprising a weighing unit and a frame upon which said unit is mounted so as to swing freely in any direction.

8. A weighing scale comprising a weighing unit, a frame upon which said unit is mounted so as to swing freely in any direction, and means to lock said unit in any position assumed thereby.

9. A scale comprising a base, a lever pivoted on a base, a load pan pivoted to the lever and a sliding poise on said lever, said lever, pan, and poise constituting a weighing unit, with means to simultaneously position and lock the poise and lever in relation to said base with all pivots moved and held away from contact with the weighing bearings for such pivots.

LOUIS JAENICHEN.